United States Patent
Karlsson

(10) Patent No.: US 7,565,156 B2
(45) Date of Patent: Jul. 21, 2009

(54) METHOD AND TECHNIQUE FOR THE PROCESSING AND DISPLAY OF WIDEBAND GEOLOCATION DETERMINATION DATA

(75) Inventor: Lars Karlsson, Los Altos Hills, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 656 days.

(21) Appl. No.: 11/203,016

(22) Filed: Aug. 11, 2005

(65) Prior Publication Data

US 2006/0034324 A1    Feb. 16, 2006

Related U.S. Application Data

(60) Provisional application No. 60/600,641, filed on Aug. 11, 2004, provisional application No. 60/600,642, filed on Aug. 11, 2004, provisional application No. 60/600,643, filed on Aug. 11, 2004, provisional application No. 60/600,657, filed on Aug. 11, 2004.

(51) Int. Cl.
*H04Q 7/20*  (2006.01)

(52) U.S. Cl. ............... 455/456.1; 455/456.3; 455/457; 455/67.15; 455/404

(58) Field of Classification Search .......... 455/456.1, 455/456.3, 457, 67.15, 566, 404.2, 108, 112
See application file for complete search history.

(56) References Cited

U.S. PATENT DOCUMENTS

| | | | |
|---|---|---|---|
| 7,002,509 B2 | 2/2006 | Karlsson | |
| 7,075,482 B2 | 7/2006 | Karlsson | |
| 7,095,779 B2 | 8/2006 | Karlsson | |
| 7,099,369 B2 | 8/2006 | Karlsson | |
| 7,126,979 B2 | 10/2006 | Karlsson | |
| 2004/0164901 A1 | 8/2004 | Karlsson | |
| 2004/0164902 A1 | 8/2004 | Karlsson | |
| 2004/0208239 A1 | 10/2004 | Karlsson | |
| 2004/0211260 A1* | 10/2004 | Girmonsky et al. | ........... 73/579 |
| 2004/0249566 A1* | 12/2004 | Jeon | ........... 701/200 |
| 2005/0032525 A1* | 2/2005 | Gasbarro | ........... 455/456.1 |
| 2006/0034323 A1 | 2/2006 | Karlsson | |
| 2006/0212929 A1 | 9/2006 | Karlsson | |

* cited by examiner

*Primary Examiner*—Tuan A Pham

(57) ABSTRACT

An interactive graphical user interface (GUI) for displaying frequency, amplitude and geolocation information provided by a local intelligence system is provided comprising: a plot of radio frequency (RF) versus amplitude, and a map indicating location of RF signals. The intelligence system has a front end to generate digital data based on received RF signals, a post processing stage to process the digital data, and a geolocation module to prevent the post-processing stage from processing a first portion of the digital data that corresponds to RF signals originating from a geographic location other than a predetermined geographic location. The GUI is updated continuously in near real time. Methods of operating the GUI are also provided.

17 Claims, 3 Drawing Sheets

Use of Map GUI to Isolate Signals from Specific Locations

Legend:
A – Friendly area of battlefield
B, C – Enemy areas of battlefield
1, 2, .. N – Wideband collection nodes with geolocation Example Diagram of a Present-day Signal Collection
Graphical User Interface Legend:
A – Friendly area of battlefield
B, C – Enemy areas of battlefield
1, 2, .. N – Wideband collection nodes with geolocation

METHOD AND TECHNIQUE FOR THE PROCESSING AND DISPLAY OF WIDEBAND GEOLOCATION DETERMINATION DATA

CROSS REFERENCE TO RELATED APPLICATIONS

This application claims priority from U.S. Provisional Patent Application Ser. Nos. 60/600,641, 60/600,642, 60/600,643 and 60/600,657, all filed Aug. 11, 2004, incorporated by reference herein in their entireties.

FIELD OF THE INVENTION

The present invention generally relates to graphical user interface (GUI) displayable on a computer screen or other monitor for display of complex frequency, amplitude and geolocation information related to signal intelligence systems.

BACKGROUND OF THE INVENTION

Present day military-grade signal collection and surveillance equipment is used to capture communications transmissions from enemy radios and/or clandestine sources. A crucial piece of this equipment is the wideband collection system. The wideband collection system can intercept various wireless communications over a large subset of the RF spectrum. The interception of various wireless communications is a critical signal intelligence function that is vital for national security interests. The captured signals and raw data energy enter the analysis and post-processing pipeline, where the actual voice or digital data is extracted. For a networked system of wideband collection boxes with direction finding determination capabilities, the geolocation of the source of the signals is also determined.

Currently, the high end signal collection equipment that is used generates a lot of information; the amount of information exceeds the capabilities of current graphical user interfaces (GUIs) to display the information to the operator. This is a significant problem today. The modern military unit or intelligence organization needs GUI tools to display (intuitively and automatically) the massive amounts of data and computation results that state-of-the-art wideband systems with DF capability generate. The unit or intelligence organization also needs to be much more efficient; the organization needs GUI tools that help filter out extraneous, unwanted signal data automatically. This present requirement is critical since currently there are not enough human resources to analyze all captured signal data properly.

Prior art methods for the display of direction attributes of signal data are archaic, because they are designed for use with systems that employ only narrowband, single channel receivers. The prior art GUI displays are limited in their use and incapable of displaying the range of signal attributes detected by today's wideband collection systems. Among these attributes are frequency, amplitude, and source geolocation. Prior art GUIs also do not help the efficiency of the system operator, by filtering out signals coming from unimportant locations.

Over time, the capabilities of wideband collection systems will grow exponentially. This flood of detected data poses a significant threat to national security since the intelligence information ages quickly, and thus as much of the signal data as possible needs to be understood very quickly. As more and more data is received, modern user interfaces of wideband systems must adapt so as not to overwhelm the user with data.

The GUI needs to abstract the data at a high enough level so that the user is protected from the flood of raw information. The raw information is still very important, so while the GUI needs to show a high level of abstraction, the GUI also needs to allow the user to drill down into any specific data of interest. The GUI also needs to offer the operator options to filter out signals. Thus the capability of the GUI must grow exponentially to meet the demands of growing amounts of detected data.

What is needed therefore in order to quickly understand and interact with the many signals detected by modern wideband signal collection systems is a real-time graphical user interface that can handle the display of much information, intuitively and interactively. What is needed is an invention that adds capabilities far beyond prior art systems. What is needed is a GUI display that allows user to isolate incoming signals by their originating location on a map. This must be done in real time. Such a capability will vastly enhance the overall signal collection process capability and efficiency as opposed to prior art methods.

SUMMARY OF THE INVENTION

The invention of this patent helps the operator to understand, and intelligently filter the various attributes of the received data as quickly and as efficiently as possible. The invention of this provisional patent application is clearly superior to prior art GUI methods because it allows the signal detection system user to grasp much more information much more quickly. The invention also allows the user to interact with the data in novel ways. This invention is therefore vital to the interests of United States national security; the display of signal intelligence data is far more efficient than prior art methods.

The capabilities of this invention are only possible given the parallel, real-time nature of the geolocation determination calculations of the invention described in U.S. Provisional Patent Application Ser. No. 60/600,642, "Method And Technique For Gathering Signal Intelligence Of All Radio Communications Only Originating From Specific Selected Areas." Because the geolocation of the sources of signals is one attribute of the data shown, the graphic display of many geolocations in parallel depends on the parallel real-time calculations of many signal source geolocations by the invention of the previous patent.

The method of this provisional patent application provides such a graphical user interface (GUI). In conclusion, insofar as I am aware, no invention formerly developed provides this unique method to allow users to isolate and process only signals transmitted from a specified location, in real-time, with only the use of a computer mouse on a sophisticated GUI.

DETAILED DESCRIPTION OF THE INVENTION

The continuing development of wideband radio frequency receivers for collecting vast amounts of signal intelligence data magnifies the complexities inherent in understanding and analyzing all the data. The comprehension and analysis problems are only exacerbated by the addition of direction-finding capabilities to wideband systems; yet more attributes of signals can be determined. There is an urgent need in the U.S. and foreign military and intelligence communities to create systems that can display all the attributes of signals in more intelligent ways, and can filter out extraneous data as quickly as possible. The problem is both the wide range of information and the amount of information that is output from present-day signal collection systems.

Wideband receiver technology today is advancing rapidly, allowing many more signals to be captured and collected, much faster than ever before. A fundamental change in signal intelligence display technology is needed for the modern military force or intelligence organization to avoid being swamped by such a massive glut of information. The modern military force or intelligence organization needs the capability to analyze signal data in a timely manner, no matter how much data is captured and collected. The organization also needs the signal data filtered as efficiently as possible, so that only signals of interest are given further analysis.

It is an object of the present invention to provide graphical user interface technology to display intuitively as much data as possible, for as many attributes of signals as possible. The user interface also isolates only signals coming from specific areas of interest, and filters out all others. Such a system is unique in the number and type of signal attributes it displays; such a system is also unique in the number and type of input parameters it offers to the operator to allow the operator to tailor the displayed results. Such a system solves the efficiency and incompleteness issues of prior art systems. Such a system greatly enhances the operational capabilities of the modern intelligence organization, by allowing the organization to understand patterns and trends in signal data quickly and intuitively. Such a system can rely only on the data collection and direction finding capabilities of the invention described in U.S. Provisional Patent Application Ser. No. 60/600,657, entitled "Improved Method And Signal Intelligence Collection System That Reduces Output Data Overflow in Real Time," so that the attribute of source geolocation for many simultaneous signals can be displayed intuitively to the operator.

The preferred system includes all the abilities of the system described by the previous provisional patent application. Also, the preferred system provides the user interface described, thereby enhancing efficiency and comprehension in the signal analysis processing and post-processing pipeline.

Figure 1:
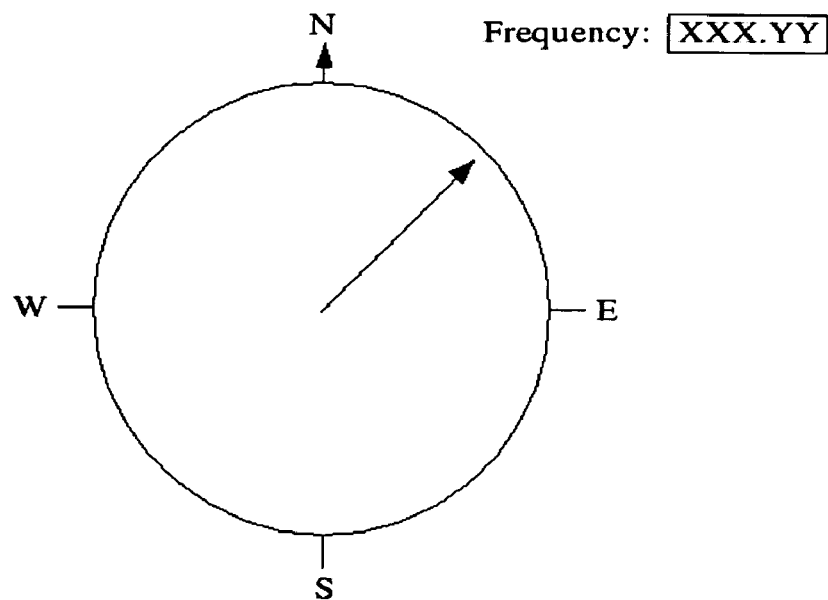
FIG. 1 is a diagram of prior art graphical user display of current signal processing and analysis systems.

The prior art of FIG. 1 shows a diagram of the graphical user display of current signal processing and analysis systems. The display is a simple compass display, in common use in today's signal processing systems, showing the direction from the narrowband receiver to the source of the signal received. The arrow indicates the direction, and the numeric display indicates the frequency of the signal. The display is useful for only narrowband systems, as it can display the direction of only one frequency at a time.

Wideband systems receive signals of many frequencies simultaneously. The prior art display is an archaic compass display that shows only two pieces of data simultaneously. The display is not even a two-dimensional graph of frequency versus direction because the present day narrowband systems can monitor only one frequency at a time. It is thus a one-dimensional display of data. Not shown by the display are other frequencies, or even the amplitude of the signal at the frequency.

The prior art display also does not isolate signals coming from a specific location. It does not filter out signals coming from unimportant locations.

Figure 2:
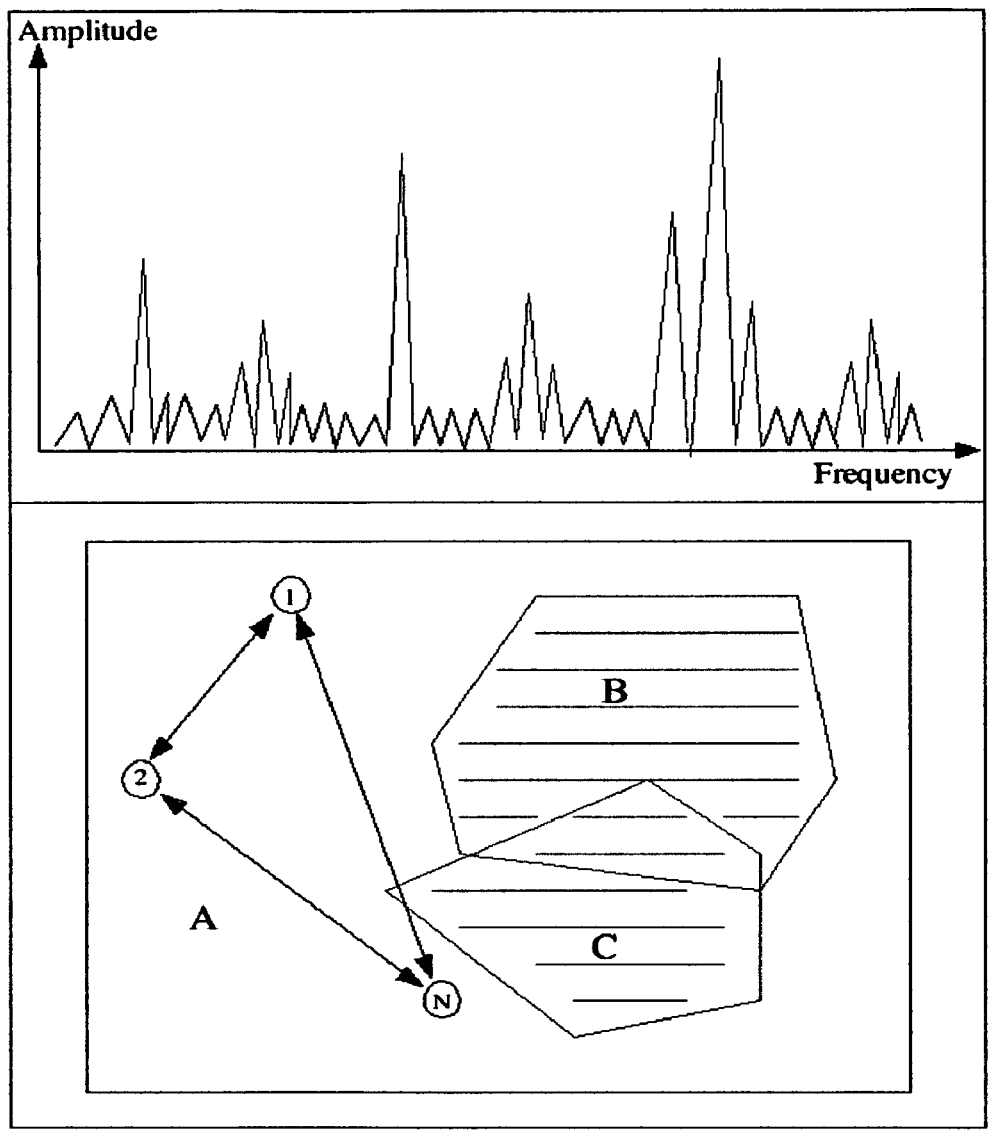
FIG. 2 is a drawing of one embodiment of the graphical user display that is the invention of this patent application.

FIG. 2 shows an example of the display of the invention. The display is comprised of two main sections: a standard RF spectrum display of frequency versus amplitude, and a two-dimensional map of the area of interest. On the computer screen, the RF spectrum display is placed on top of the map.

The green highlighted area of the lower plot is one area of interest, drawn on the map by the system operator. The amplitudes drawn in green in the upper plot, the green spikes, correspond to the amplitudes of signals found originating from the green highlighted area of interest. The same is true for the blue highlighted area. The cyan area is an area of overlap between the two areas of interest.

All GUI drawing of the spectra are done in real-time. The plots are continuously updated as the wideband receiver collects new signal information from itself and other wideband receivers and processes the geolocation of the incoming signals.

The display shows four complete dimensions of the state of the RF spectrum, the four dimensions being the two attributes of frequency and amplitude, along with the two dimensions of geographic geolocation. The display is divided into two graphs, one above and one below. The upper graph is a graph of amplitude versus frequency and the lower graph is a map of the area of interest. The top graph covers a wide range of frequencies, monitored simultaneously.

The bottom half of the display is a map, where the system operator can indicate any specific areas of interest to highlight and isolate. By merely drawing on the map display, the operator commands the system to isolate those communications coming only from the area drawn, for further monitoring and recording. This isolation greatly enhances the efficiency of the operator, as well as the efficiency of the analysis and post-processing pipeline. This interaction between a map display and being able to selectively isolate signals emanating from certain locations within that map display is a unique process.

The operator draws on the map by picking points on the map that are the corners of the polygonal areas of interest. The operator uses a standard mouse to pick points on the user interface. The map control software automatically commands the spectrum display and the wideband receiver control software to change their focus to signals received only from the areas of interest. The spectrum display changes colors accordingly; the wideband system monitors and records only the signals from the areas of interest.

The lower half of the display is very interactive and easy to use; it allows the operator to change many of its display characteristics. Among these changeable display parameters are the extents of the area of interest to show, the size and shape of the areas of interest, the colors of the areas of interest, how many areas of interest to highlight, and so forth.

The top half of the display is the classic RF spectrum plot of amplitude versus frequency. The drawing of this plot reacts to user changes made in the lower plot; for example, if the user changes the color of an area of interest, the frequencies from that area are drawn in the new color in the upper plot.

The capabilities of this invention thus solve the limited usefulness and limited data shown by the prior art GUIs. The capabilities of this invention are only possible given the signal collection and geolocation determination capabilities of the invention described by the previous provisional patent application "Improved Method And Signal Intelligence Collection System That Reduces Output Data Overflow in Real Time."

This invention is unique since no other user interface has the capability or ease of use to allow the operator to outline any area on a map, and immediately have the communications originating from that area isolated for further analysis. The signals from that specific area are instantly highlighted, monitored, and recorded. Thus this invention dramatically increases the efficiency of the wideband system operator, and of the whole analysis and post-processing pipeline.

Operation

The invention of this patent adds intuitive user interface interaction to the invention described in the previous provisional patent application "Improved Method And Signal Intelligence Collection System That Reduces Output Data Overflow in Real Time." Adding such a complete, intuitive interface is necessary because of the amount of data the system operator needs to understand and interact with. The captured signals have attributes of frequency, amplitude, and source geolocation, and thus a complete interface needs all attributes displayed on different axes in two-dimensional graphs and maps. Also, the flexible interface can be configured to show signals coming from only specific locations of interest.

Before the system invention starts standard operation, the operator can use the interface to setup how much data will be displayed. The operator does this by setting the ranges of the axes of the graphs to be shown. The operator can limit the amount of frequencies to be shown, and also the amount of area to be shown on the map. For example, if the operator wants to focus on a specific area of interest, the operator can zoom the map display to show only that area. The operator can also pan across the map as needed.

During the setup phase, the operator also sets how fast the commutating antenna switches, how fine the resolution of the FFT calculations should be, and so forth. These settings do not show up explicitly in the GUI; their function is explained in the previous provisional patent application.

The operator then places the system into operation, and the wideband receiver starts collecting data. While the wideband system continuously collects data, data is displayed automatically in the frequency versus amplitude graph, and the two-dimensional area map.

The operator may choose various colors for the display of each area of interest's data. For example, if the operator commands the GUI to show all data from a specific area in green, then data for that area is shown in green in both the upper graph and the lower map. See FIG. 2 for an example of this. The green polygonal area in the lower map of FIG. 2 is an area of interest; its extents and its green color were chosen the user. The upper graph in the GUI responds to this color choice by drawing all amplitude data from that area in green as well. So the operator can see easily and intuitively the energy of the signals received from the specific chosen area.

The operator can use the mouse to drag any of the corner vertices of any of the areas of interest, for example the green one. This adjusts the extents of that area of interest in real time. The top graph also responds in real time, drawing all amplitudes for the new area in the color green.

The operator can move any area of interest around as well. Moving an entire area of interest allows the operator to sweep through a large area, looking for source geolocations of RF energy. Again, the upper graph reacts accordingly, in real time, to draw amplitudes of signals from those compass points in the area's color.

The operator can analyze and interact with more than one area at a time, by choosing a new area with a new color. The operator is free to choose any area on the map. The new area can be interacted with in the same manner as already described. Thus two or more areas can be analyzed at the same time, each in their own color.

If two areas of different colors overlap in the lower graph, the overlapping portion can be drawn in a color that is the color sum of the two area's individual colors. This color sum is calculated in RGB color space. A green area overlapping a blue area would cause the overlapped area to be drawn in the color cyan, for example; see FIG. 2 for an example of this overlapping. The operator can override this automatic color choice, if desired. Again, the upper graph responds accordingly by drawing all amplitudes from the overlapped portion in the combined color.

In real time, the wideband collector then filters out all communications except for those coming from areas highlighted by the system operator. This isolation ensures that only signals of interest are recorded and later analyzed. Thus the efficiency of the monitoring operations is greatly increased. The system operator and all the analysts in the post-processing pipeline therefore become much more productive.

Figure 3:
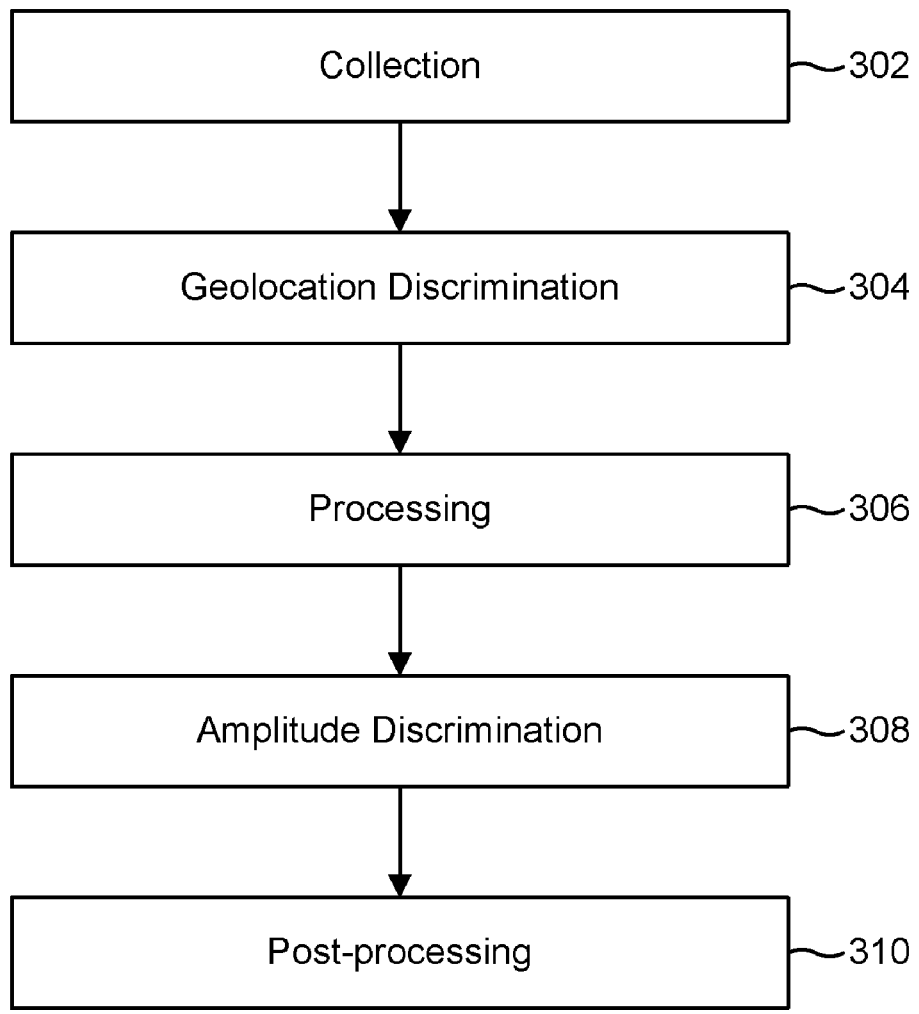
FIG. 3 is a block diagram illustrating a signal processing and analysis system with geolocation determination capabilities.

FIG. 3 shows a block diagram of a signal collection and analysis system that has geolocation discrimination capabilities. The signal collection and analysis system may be separated into five stages: a collection stage 302, a geolocation discrimination stage 304, a processing stage 306, an amplitude discrimination stage 308, and a post-processing 310 stage.

The collection stage 302 may include radio frequency receiving hardware: antennas, wideband receivers, etc. The geolocation discrimination stage 304 may be implemented by a geolocation module, and may use a standard triangulation algorithm to determine the geolocation of the source of a signal, given the direction finding (DF) data from all the collection systems. In one embodiment, the geolocation discrimination stage 304 adds geolocation information as a discriminator to the front end of signal detection systems. The added geolocation information may automatically filter extraneous signals arriving from geolocations that are not of interest to the intelligence organization.

In one embodiment, the geolocation determination algorithm adds a new discriminator besides presence and amplitude of a signal, so that many more signals may be discarded rather than enter the post-processing 310 stage. The geolocation algorithm implemented in the discrimination stage 304 may also determine whether to discard a signal or not before any processing takes places in the processing stage 306.

The processing stage 306 includes one or more hardware logic modules that perform fast fourier transformations (FFTs). An amplitude discrimination stage 308 may include hardware that performs peak detection algorithms to determine the amplitudes of the frequencies received. The post-processing stage 310 includes more computer resources, as well as human resources, to completely analyze the intelligence worthiness of each signal that makes it though this chain (302-308).

What is claimed is:

1. An interactive graphical user interface for displaying frequency, amplitude and geolocation information provided by a local intelligence system having a front end to generate digital data based on received radio frequency (RF) signals, a post processing stage to process the digital data, and a geolocation module to prevent the post-processing stage from processing a first portion of the digital data that corresponds to RF signals originating from a geographic location other than a predetermined geographic location, comprising:

a two-dimensional map for displaying geolocation information; and a plot of RF versus amplitude for RF signals corresponding to the geolocation information displayed by the two-dimensional map, the information for the RF versus amplitude plot being provided by the local intelligence system.

2. The graphical user interface of claim 1, wherein the RF spectrum display is placed on top of the map when displayed on a computer screen.

3. The graphical user interface of claim 1, wherein the plots are continuously updated as the intelligence system collects new signal information from itself and other wideband receivers and processes the geolocation of the incoming signals.

4. The graphical user interface of claim 1, wherein the plot of RF versus amplitude is responsive to user changes to display parameters made in the two dimensional map.

5. The graphical user interface of claim 1, wherein the user changes to display parameters comprise the areas of interest to show on the map, extent of the areas of interest to show on the map, the size and shape of the areas of interest, the colors of the areas of interest, or how many areas of interest to highlight.

6. The graphical user interface of claim 1, wherein the user can command the system to isolate communications coming only from specified areas for further monitoring and recording.

7. The graphical user interface of claim 6, wherein the user can command the system to isolate communications coming from two or more specified areas for further monitoring and recording.

8. The graphical user interface of claim 7, wherein an area of overlap between the two areas is indicated by additive coloration from the colors of the two or more areas.

9. A method for displaying frequency, amplitude, and geolocation information, the method the comprising:

providing frequency, amplitude, and geolocation information from a local intelligence system having a front end to generate digital data based on received radio frequency (RF) signals, a post processing stage to process the digital data, and a geolocation module to prevent the post-processing stage from processing a first portion of the digital data that corresponds to RF signals originating from a geographic location other than a predetermined geographic location on a plot of RF versus amplitude and a two-dimensional map; and providing a graphical user interface to display the two-dimensional map and the plot of RF versus amplitude, the two-dimensional map displaying geolocation information, and the plot of RF versus amplitude displaying information for RF signals corresponding to the geolocation information displayed by the two-dimensional map, the information for the RF versus amplitude plot being provided by the local intelligence system.

10. The method of claim 9, wherein the local intelligence system continuously collects and displays data automatically in near real time in the plot of RF versus amplitude and the two-dimensional map.

11. A method for operating a graphical user interface for displaying frequency, amplitude, and geolocation information, the method comprising:

obtaining frequency, amplitude, and geolocation information from a local intelligence system, the local intelligence system having a front end to generate digital data based on received RF signals, a post processing stage to process the digital data, and a geolocation module to prevent the post-processing stage from processing a first portion of the digital data that corresponds to RF signals originating from a geographic location other than a predetermined geographic location, viewing, via the graphical user interface, a two-dimensional map for displaying geolocation information, and the plot of RF versus amplitude for RF signal corresponding to the geolocation information displayed by the two-dimensional map, the information for the RF versus amplitude plot being provided by the local intelligence system, and controlling, via the graphical user interface, the location area, frequency or amplitude data displayed on the graphical user interface, the displayed frequency and amplitude data corresponding to the displayed location area.

12. The method of claim 11, wherein controlling the location area comprises indicating areas on a map on the graphical user interface.

13. The method of claim 12, wherein indicating areas on a map is performed by picking points on the map that correspond to corners of polygonal areas of interest using a mouse.

14. The method of claim 13, further comprising adjusting the extents of the areas in real time by using a mouse to drag any of the corners of any of the areas of interest.

15. The method of claim 13, further comprising moving any area.

16. The method of claim 11, wherein controlling the location area, frequency or amplitude data displayed is performed by setting the ranges of the axes of the graphs, or choosing display colors.

17. The method of claim 11, wherein the method comprises analyzing and interacting with more than one area at a time.

* * * * *

UNITED STATES PATENT AND TRADEMARK OFFICE
CERTIFICATE OF CORRECTION

| | | |
|---|---|---|
| PATENT NO. | : 7,565,156 B2 | Page 1 of 1 |
| APPLICATION NO. | : 11/203016 | |
| DATED | : July 21, 2009 | |
| INVENTOR(S) | : Lars Karlsson | |

It is certified that error appears in the above-identified patent and that said Letters Patent is hereby corrected as shown below:

In column 7, line 37, in Claim 9, delete "method the" and insert -- method --, therefor.

Signed and Sealed this

Twenty-ninth Day of September, 2009

David J. Kappos
*Director of the United States Patent and Trademark Office*